United States Patent
Siessegger

(10) Patent No.: US 7,221,103 B2
(45) Date of Patent: May 22, 2007

(54) CIRCUIT FOR OPERATING HIGH-PRESSURE DISCHARGE LAMPS

(75) Inventor: Bernhard Siessegger, München (DE)

(73) Assignee: Patent-Treuhand-Gesellschaft fur Elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/565,073

(22) PCT Filed: Jul. 23, 2004

(86) PCT No.: PCT/DE2004/001643

§ 371 (c)(1),
(2), (4) Date: Jan. 18, 2006

(87) PCT Pub. No.: WO2005/011338

PCT Pub. Date: Feb. 3, 2005

(65) Prior Publication Data

US 2006/0164023 A1  Jul. 27, 2006

(30) Foreign Application Priority Data

Jul. 23, 2003 (DE) ................. 103 33 729
Apr. 26, 2004 (DE) ............ 10 2004 020 500

(51) Int. Cl.
 *H05B 41/16* (2006.01)
(52) U.S. Cl. ............... 315/274; 315/279; 315/209 CD; 315/213
(58) Field of Classification Search ............ 235/454, 235/382, 385, 487, 492; 315/274–279, 209 R, 315/209 CD, 219, 223–225
See application file for complete search history.

(56) References Cited

U.S. PATENT DOCUMENTS 3,555,352 A * 1/1971 Michalski ................ 315/282

(Continued)

FOREIGN PATENT DOCUMENTS

EP  0922375  8/1996

(Continued)

OTHER PUBLICATIONS

Ben-Yaakov "Design and Performance of an Electronic Ballast for High Pressure Sodium (HPS) Lamps", Applied Power Electronics Conference and Exposition, 1995.

(Continued)

*Primary Examiner*—Tuyet Thi Vo
(74) *Attorney, Agent, or Firm*—Carlo S. Bessone

(57) ABSTRACT

A circuit for operating high-pressure discharge lamps, wherein a voltage transformer for power supply to a loading circuit includes a connection for the high-pressure discharge lamp (La) and for the secondary winding (L1b) of an ignition transformer (T1) for an impulse ignition system for igniting a gaseous discharge in the high-pressure discharge lamp. The loading circuit includes at least one capacitor (C1) serially arranged with the secondary winding (L1b) of the ignition transformer (T1) when the impulse ignition system is reconnected, the capacity of the capacitor (C1) being selected in such away that the capacitor (C1) substantially forms a bridging for ignition impulses generated by the impulse ignition device in such a way that after ignition of the gaseous discharge in the high-pressure discharge lamp (La), at least one partial compensation of the ignition transformer (T1) is produced when the lamp current passes through the secondary winding (L1b).

4 Claims, 3 Drawing Sheets

U.S. PATENT DOCUMENTS

Figure 1:
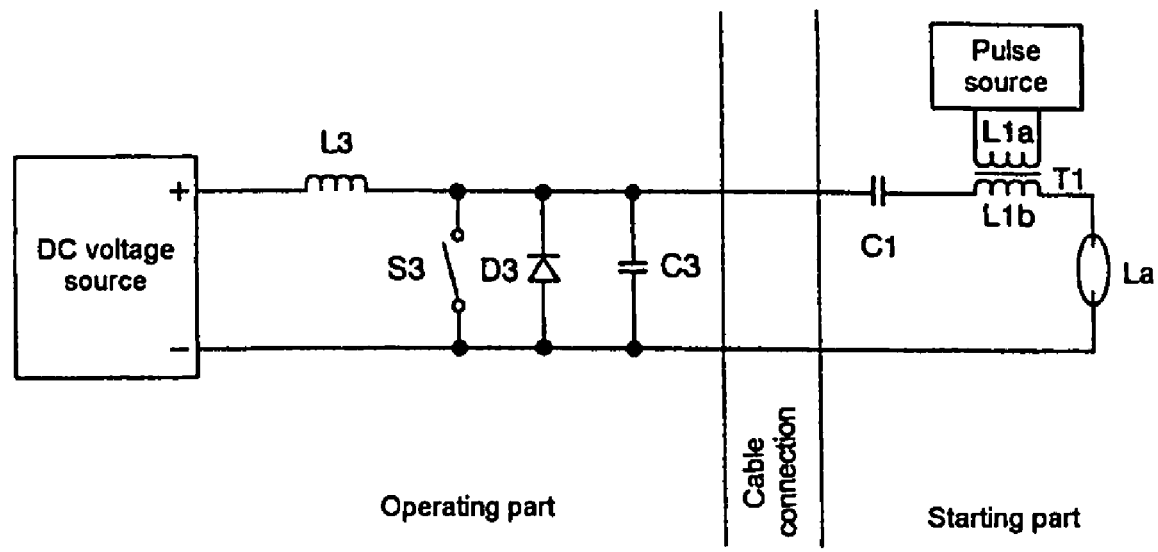

| | | |
|---|---|---|
| 4,912,374 A * | 3/1990 | Nagase et al. ............... 315/244 |
| 5,990,633 A | 11/1999 | Hirschmann et al. |
| 6,100,652 A | 8/2000 | Konopka |
| 6,194,844 B1 | 2/2001 | Rupp et al. |

FOREIGN PATENT DOCUMENTS

| | | |
|---|---|---|
| EP | 0 987 928 | 9/1998 |
| WO | WO 98/1 8297 | 10/1996 |

OTHER PUBLICATIONS

Gulko & Yaakov "A MHz Electronic Ballast for Automotive-Type HID lamps", IEEE Power Electronics Specialists Conference, PESC-97, 1997.

* cited by examiner

CIRCUIT FOR OPERATING HIGH-PRESSURE DISCHARGE LAMPS

The invention relates to a circuit for operating high-pressure discharge lamps in accordance with the preamble of patent claim 1.

I. PRIOR ART

Such a circuit is described, for example, in the article by Michael Gulko and Sam Ben-Yaakov "A MHz Electronic Ballast for Automotive-Type HID Lamps" IEEE Power Electronics Specialists Conference, PESC-97, pages 39-45, St. Louis, 1997. This publication discloses a current-fed push-pull converter, which applies a radio frequency AC voltage via a transformer to a load circuit in which a high-pressure discharge lamp is connected. In addition, the secondary winding of the starting transformer of a starting device, which generates the starting voltage for the purpose of starting the gas discharge in the high-pressure discharge lamp, is connected in the load circuit.

The laid-open specification WO 98/18297 describes a push-pull converter which applies a radio frequency AC voltage via a transformer to a load circuit and a pulse starting device which is DC-isolated from said load circuit. A high-pressure discharge lamp is connected in the load circuit. The pulse starting device provides high-voltage pulses to an auxiliary starting electrode of the high-pressure discharge lamp during the starting phase.

II. SUMMARY OF THE INVENTION

It is the object of the invention to provide a generic circuit having low power loss. This object is achieved according to the invention by the features of patent claim 1. Particularly advantageous embodiments of the invention are described in the dependent claims.

The circuit according to the invention for operating high-pressure discharge lamps has a voltage converter for the purpose of supplying energy to a load circuit which is provided with connections for a high-pressure discharge lamp and for the secondary winding of a starting transformer of a pulse starting device which serves the purpose of starting the gas discharge in the high-pressure discharge lamp, and is characterized by the fact that at least one capacitor, which is connected in series with the secondary winding of the starting transformer when the pulse starting device is connected, is arranged in the load circuit, the capacitance of the capacitor being dimensioned such that it essentially represents a short circuit for the starting pulses generated by the pulse starting device and, once the gas discharge in the high-pressure discharge lamp has been started, brings about at least partial compensation of the inductance of the starting transformer if the lamp current is flowing through the secondary winding.

Owing to the at least partial compensation of the inductance of the secondary winding, through which the lamp current flows, of the starting transformer by means of the at least one capacitor, it is possible for the voltage drop caused by it in the load circuit to be reduced to a desired level, as a result of which the power loss in the components of the voltage converter, in particular in its semiconductor switches and in the transformer at its voltage output, is reduced. The capacitance of the at least one capacitor C1 can be calculated from the available inductance of the starting transformer secondary winding L1b, the desired effective inductance $L_{des}$ of the starting transformer secondary winding and the switching frequency f of the voltage converter or the frequency of the AC lamp current:

$$C1 = 1/(4\pi^2 f^2 (L1b - L_{des})).$$

A high starting inductance L1b results in a high magnification factor for the load circuit fed by the voltage converter, and, as the magnification factor increases, the lamp current assumes an ideally sinusoidal waveform. As a result, the electromagnetic compatibility of the circuit is increased. In addition, acoustic resonances in the discharge medium are as a result now only excited at a low intensity.

The abovementioned at least one capacitor may also be formed as part of a pulse starting device for a high-pressure discharge lamp which, for its part, can be accommodated in turn in the lamp base of the high-pressure discharge lamp.

The resonant frequency of the series resonant circuit formed from the abovementioned capacitor and the secondary winding of the starting transformer is preferably greater than 500 kilohertz in order to make it possible to operate the lamp above its acoustic resonances and to make possible a physically compact starting device. In addition, at operating frequencies of above approximately 300 kilohertz, the inductance of the secondary winding is particularly disruptive during lamp operation.

The inductance of the secondary winding of the starting transformer should be as low as possible, despite the possibility of compensation using the abovementioned capacitor, in order to minimize losses in the starting transformer during lamp operation at a high frequency, typically greater than 500 kilohertz. It should preferably be less than 500 µH.

III. DESCRIPTION OF THE PREFERRED EXEMPLARY EMBODIMENTS

Figure 2:
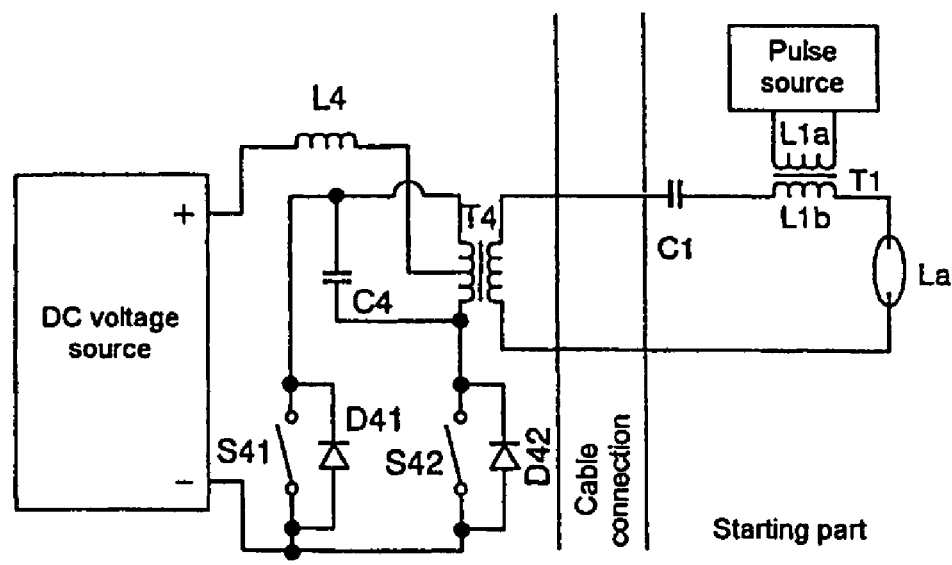
Figure 3:
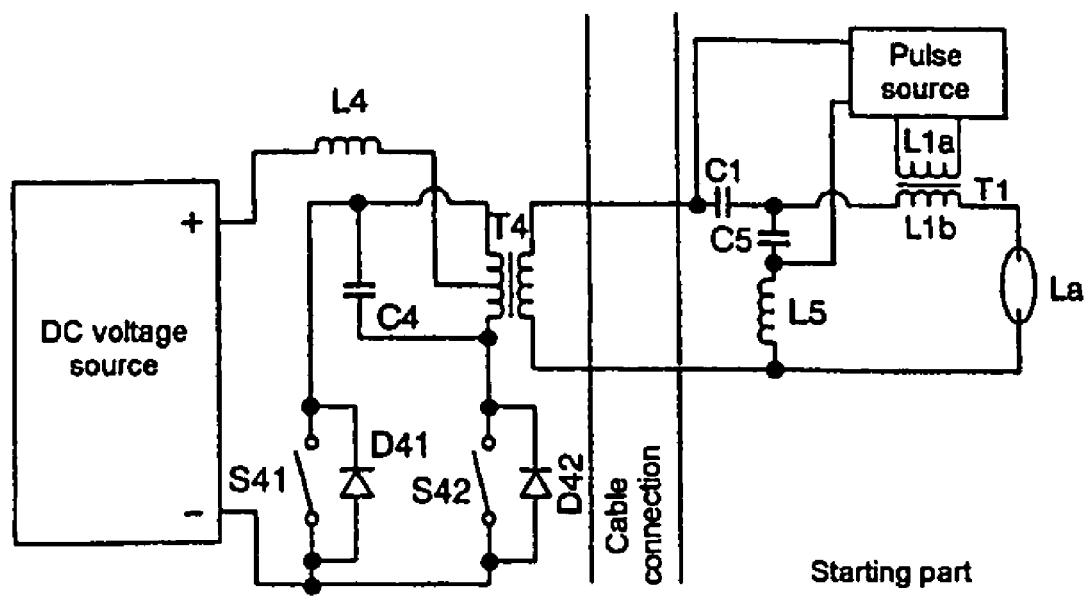
Figure 4:
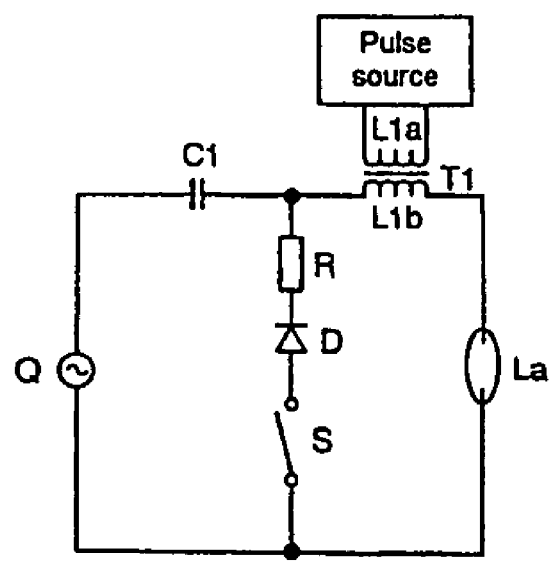
Figure 5:
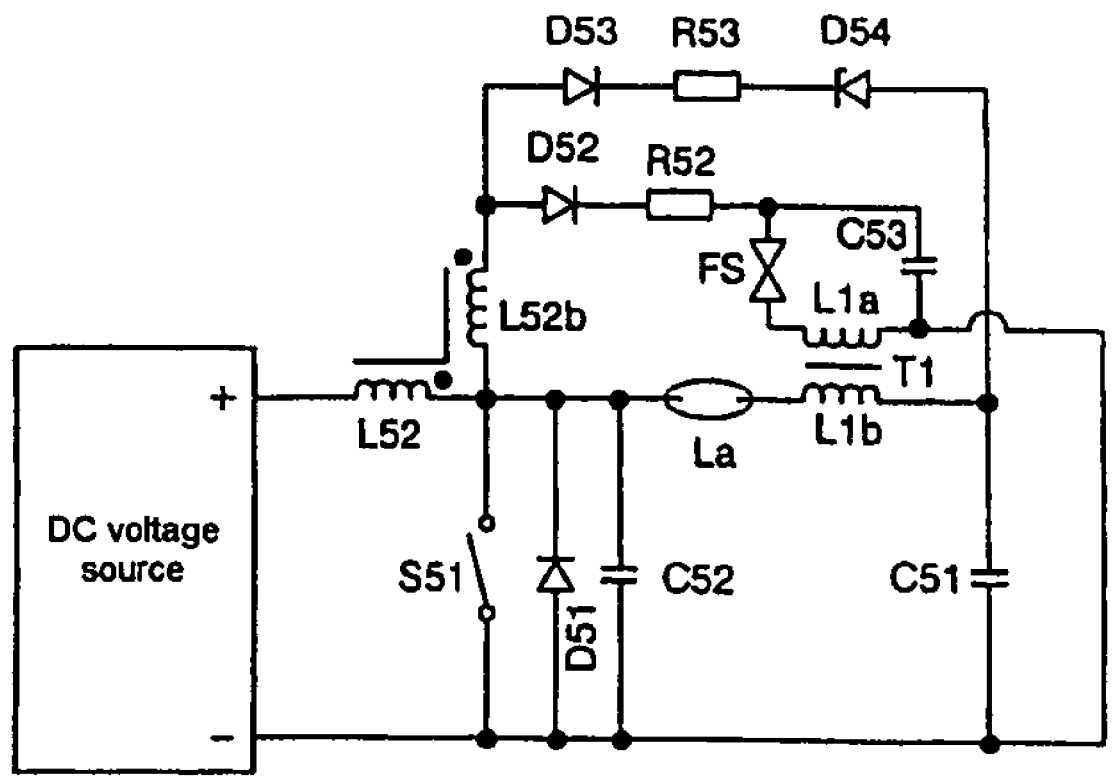

The invention will be explained in more detail below with reference to a few preferred exemplary embodiments. In the drawing:

FIG. 1 shows a circuit for operating a high-pressure discharge lamp in accordance with the first exemplary embodiment of the invention, FIG. 2 shows a circuit for operating a high-pressure discharge lamp in accordance with the second exemplary embodiment of the invention, FIG. 3 shows a circuit for operating a high-pressure discharge lamp in accordance with the third exemplary embodiment of the invention, FIG. 4 shows a circuit for operating a high-pressure discharge lamp in accordance with the fourth exemplary embodiment of the invention, and FIG. 5 shows a circuit for operating a high-pressure discharge lamp in accordance with the fifth exemplary embodiment of the invention.

The exemplary embodiments of the invention depicted in FIGS. 1 to 5 are circuits and pulse starting devices for operating a mercury-free halogen metal-vapor high-pressure discharge lamp having an electrical power consumption of approximately 35 watts, which is envisaged for use in the headlight of a motor vehicle.

FIG. 1 shows a first exemplary embodiment of a circuit according to the invention for operating the abovementioned mercury-free halogen metal-vapor high-pressure discharge lamp. In addition, a pulse starting device, referred to in the figures as the pulse source, for the purpose of starting the gas discharge in the mercury-free halogen metal-vapor high-pressure discharge lamp is also depicted and is accommodated in the lamp base. The circuit comprises a DC voltage source which is formed by the battery or generator of the motor vehicle, and an inductor L3, a controllable semiconductor switch S3, a diode D3 which is connected in parallel with said semiconductor switch S3, and a capacitor C3 which is arranged in parallel with the diode D3 and the switch S3. The components L3, S3, D3 and C3 are connected to one another in the form of a current-fed Class E converter. They form the operating part of the circuit. The capacitor C3 forms the voltage output of the abovementioned converter, to which a load circuit is connected, which is provided with connections for the high-pressure discharge lamp La and the pulse starting device. The pulse starting device comprises a starting transformer T1, whose secondary winding L1b is connected in the load circuit. The capacitor C1, which, during lamp operation, brings about partial compensation of the inductance of the secondary winding L1b, through which the lamp current flows, once the starting phase of the high-pressure discharge lamp La has ended on the basis of the dimensioning of its capacitance, is connected in series with the secondary winding L1b of the starting transformer. The operating and starting parts are in this case connected to one another by means of shielded coaxial cables. The capacitor C1 is in this case in the form of a component of the pulse starting device and is accommodated in the lamp base. The dimensions for the capacitor C1 and the starting transformer T1 with the secondary winding L1b are specified in the table.

FIG. 2 shows a second exemplary embodiment of a circuit according to the invention for operating the abovementioned mercury-free halogen metal-vapor high-pressure discharge lamp. In addition, a pulse starting device, referred to in the figures as the pulse source, for the purpose of starting the gas discharge in the mercury-free halogen metal-vapor high-pressure discharge lamp is also depicted and is accommodated in the lamp base. The circuit comprises a DC voltage source which is formed by the battery or generator of the motor vehicle, and an inductor L4, a capacitor C4, two controllable semiconductor switches S41, S42, each having a diode D41 and D42, respectively, which are connected in parallel with said semiconductor switches S41, S42, and a transformer T4 having two primary and one secondary winding. The switches S41, S42 are in the form of field-effect transistors (MOSFETs), and the diodes D41 and D42 are the so-called body diodes integrated in the field-effect transistors S41 and S42, respectively. The inductor L4, the capacitor C4, the semiconductor switches S41, S42 with their diodes D41, D42 and the transformer T4 are connected to one another in the form of a current-fed push-pull converter, as is described in the above-cited prior art. Once the gas discharge in the lamp La has been started, an approximately constant current is impressed at the center tap between the two primary windings, which are polarized in the same sense, of the transformer T4 with the aid of the inductor L4. The semiconductor switches S41, S42 switch alternately such that always one of the two switches S41, S42 is closed. The abovementioned components of the circuit form the operating part for the lamp La, which is arranged in a housing, separately from the lamp. A load circuit, which is equipped with connections for the mercury-free halogen metal-vapor high-pressure discharge lamp La and the pulse starting device, is connected to the secondary winding of the transformer T4. The pulse starting device comprises a starting transformer T1, whose secondary winding L1b is connected in the load circuit. The capacitor C1, which, during lamp operation, brings about partial compensation of the inductance of the secondary winding L1b, through which the lamp current flows, once the starting phase of the high-pressure discharge lamp La has ended on the basis of the dimensioning of its capacitance, is connected in series with the secondary winding L1b of the starting transformer T1. The operating and starting parts are in this case connected to one another by means of shielded coaxial cables. The capacitor C1 is in this case in the form of a component of the pulse starting device and is accommodated in the lamp base.

The circuit depicted in FIG. 3 of the third exemplary embodiment differs from that of the second exemplary embodiment only in terms of the additional series resonant circuit components C5, L5 which are connected in parallel with the secondary winding of the transformer T4. Identical components therefore have the same references in FIGS. 2 and 3. The capacitors C1, C5 and the inductance L5 together form a series resonant circuit which supplies the pulse starting device with energy during the starting phase of the high-pressure discharge lamp La. For this purpose, the voltage input of the pulse starting device is connected in parallel with the capacitors C1, C5, which are connected in series during the starting phase of the lamp La. Once the starting phase has ended, the components C5, L5, which are connected in parallel with the discharge path of the high-pressure discharge lamp La, of the series resonant circuit are short-circuited by the now conductive discharge path of the lamp La, and the switching frequency of the current-fed push-pull converter is increased to such an extent that it is close to the resonant frequency of the series resonant circuit, which is formed by the capacitor C1, which is now connected in series with the secondary winding L1b of the starting transformer T1, and the abovementioned secondary winding L1b. Once the starting phase has ended, the capacitor C1 brings about partial compensation of the inductance of the secondary winding L1b, through which the lamp current flows, of the starting transformer T1 during lamp operation, as a result of which the power losses in the semiconductor switches S41, S42 of the push-pull converter and the transformer T4 are reduced. The dimensions for the components in accordance with the second and third exemplary embodiment are given in the table.

During the starting phase of the high-pressure discharge lamp La, the field-effect transistors S41, S42 are switched alternately at a switching frequency of 350 kilohertz, which corresponds to the resonant frequency of the series resonant circuit L5, C5, C1, by their drive device (not shown), which is, for example, in the form of a microcontroller. As a result, an AC voltage having the same frequency is generated at the secondary winding of the transformer T4, and an AC voltage of approximately 2 500 volts which is increased owing to resonance is produced from this AC voltage by means of the abovementioned series resonant circuit. A correspondingly high input voltage is therefore made available for the pulse starting device at the series circuit comprising the capacitors C5, C1, and this input voltage is sufficient to charge the starting capacitor (not shown) of the pulse starting device to the breakthrough voltage of the spark gap (not shown) of the pulse starting device via the rectifier diode (not shown) and the charging resistor (not shown). On breakthrough of the spark gap, the starting capacitor is discharged via the primary winding L1a of the starting transformer T1, and high-voltage starting pulses of up to 30 000 volts are generated in its secondary winding L1b for the purpose of starting the gas discharge in the high-pressure discharge lamp La. Once the gas discharge in the high-pressure discharge lamp La has been started, the series resonant circuit L5, C5 is short-circuited by the now conductive discharge path of the lamp La, and, as a result, the input voltage provided at the resonant capacitor C5 for the pulse starting device is no longer sufficient to charge the starting capacitor to the breakthrough voltage of the spark gap. Once the gas discharge in the high-pressure discharge lamp La has been started, the switching frequency of the push-pull converter is increased to a frequency of 550 kilohertz. During this operating phase, the so-called start-up phase or the so-called power start-up of the lamp, the lamp La is fed an increased power in order to achieve rapid vaporization of the filler components of the discharge medium of the high-pressure discharge lamp La and thus to achieve the full light emission of the lamp La in as short a time as possible. At the end of the abovementioned power start-up, the frequency of the alternating lamp current is increased to the value of 715 kilohertz in order to ensure operation at the lamp rated power of 35 watts. The capacitor C1, which is connected in series with the secondary winding L1$b$, through which the lamp current flows, brings about partial compensation of the inductance of the secondary winding L1$b$ at this frequency and thus contributes to the reduction in the power losses in the semiconductor switches S41, S42 and the transformer T4.

The invention is not restricted to the exemplary embodiments explained in more detail above, but can also be used in conjunction with other voltage converters than the two types mentioned above.

FIGS. 4 and 5 show two further exemplary embodiments of the invention. One common factor to the two exemplary embodiments is the fact that the capacitor C1 or C51, which is used for partial compensation of the inductance of the secondary winding L1$b$ of the starting transformer T1, has a DC voltage applied to it before the gas discharge in the lamp La is started. This DC voltage is available to the lamp La during its starting phase in addition to the starting pulses generated by the pulse starting device. The energy output of the capacitor C1 or C51 to the lamp does not in this case take place suddenly after the discharge path of the lamp La has assumed a low resistance value owing to the starting pulse, but, owing to the inductance of the secondary winding L1$b$ of the starting transformer T1, extends over a certain period of time which is longer than the duration of the starting pulses generated by the starting device. As a result, the low-resistance state of the discharge path of the lamp La over the abovementioned period of time is maintained and the probability of a takeover by the ballast Q or the Class E converter as shown in FIG. 5, i.e. the probability that the conductive channel in the discharge plasma between the two lamp electrodes does not break off, is increased.

In the exemplary embodiment depicted in FIG. 4, the reference Q represents a ballast in accordance with the prior art for operating a high-pressure discharge lamp for a motor vehicle headlight. The capacitor C1, the pulse starting device referred to as the "pulse source", the starting transformer T1 and the lamp La are identical to the exemplary embodiments illustrated in FIGS. 1 and 2 and therefore have the same references. The capacitor C1 is charged via the switch S, the diode D and the resistor R before the gas discharge in the lamp La is started. For this purpose, the no-load voltage of the ballast Q can be used, for example. The switch S is in the form of an IGBT or MOSFET having a high off-state voltage. The exemplary embodiment depicted in FIG. 5 is the combination of a Class E converter with a pulse starting device. The components L52, S51, D51, C52 are connected to one another as a Class E converter in a similar manner to that in the first exemplary embodiment. The pulse starting device, which comprises the diode D52, the resistor R52, the spark gap FS, the starting capacitor C53 and the starting transformer T1, is supplied with energy during the starting phase of the lamp La via the second winding section L52$b$ of the autotransformer L52. The capacitor C51 has a DC voltage applied to it via the second winding section L52$b$ of the autotransformer L52, the diode D53, the resistor R53 and the zener diode D54 before the starting phase of the lamp La. This DC voltage, together with the starting pulse or the starting pulses generated by the starting transformer, brings about starting of the gas discharge in the lamp. Furthermore, the energy stored in the capacitor C51 is transferred to the lamp La during the starting phase of said lamp La. For this purpose, the capacitor is advantageously charged to a DC voltage of greater than 300 volts. In order to ensure that the capacitor C51 is charged to the desired DC voltage even before breakthrough of the spark gap FS, the time constant of the RC element R52, C53 is greater than the time constant of the RC element R53, C51. Disconnection of the charging of the capacitor C51 during lamp operation once the gas discharge has been started is ensured by a reduced voltage drop at the winding section L52$b$ during lamp operation which then drops completely across the zener diode D54 such that no notable direct current can flow through the components D53, R53, and D54.

TABLE

Dimensions for the components of the circuits in accordance with the preferred exemplary embodiments

| | |
|---|---|
| C4 | 1.0 nF, FKP1 (WIMA) |
| C5 | 35 pF |
| C1 | 570 pF |
| L4 | 60 µH, 20 turns on RM5, N49 (EPCOS) |
| L5 | 4.6 mH, EFD15, N49, 300 turns (EPCOS) |
| T4 | EFD25, N59, without air gap, secondary: 40 turns, two primary windings each having 8 turns |
| T1 | primary: 1 turn, secondary: 37 turns |
| L1$b$ | 150 µH |
| S41 (& D41) | IRF740, power MOSFET (International Rectifier) |
| S42 (& D42) | IRF740, power MOSFET (International Rectifier) |
| La | mercury-free halogen metal-vapor high-pressure discharge lamp, rated 35 watts, 45 volts |

The invention claimed is:

1. A circuit for operating high-pressure discharge lamps, the circuit having a voltage converter for the purpose of supplying energy to a load circuit which is provided with connections for a high-pressure discharge lamp (La) and for the secondary winding (L1$b$) of a starting transformer (T1) of a pulse starting device which serves the purpose of starting the gas discharge in the high-pressure discharge lamp (La), characterized in that at least one capacitor (C1), which is connected in series with the secondary winding (L1$b$) of the starting transformer (T1) when the pulse starting device is connected, is arranged in the load circuit, the capacitance of the capacitor (C51) being dimensioned such that it essentially represents a short circuit for the starting pulses generated by the pulse starting device and the capacitor (C51) is charged, before the gas discharge in the lamp is started, to a DC voltage which, together with the starting pulse or the starting pulses of the starting transformer (T1), brings about starting of the gas discharge in the lamp.

2. The circuit as claimed in claim 1, characterized in that the capacitor (C1; C51) is charged, before the gas discharge in the lamp (La) is started, to a DC voltage greater than 300 volts.

3. A pulse starting device for a high-pressure discharge lamp having a starting transformer (T1) for the purpose of producing starting pulses, characterized in that the starting device has at least one capacitor (C51), which is connected in series with the secondary winding (L1b) of the starting transformer (T1), and whose capacitance is dimensioned such that it essentially represents a short circuit for the starting pulses generated by the pulse starting device and the capacitor (C1) is charged, before the gas discharge in the lamp is started, to a DC voltage which, together with the starting pulse or the starting pulses of the starting transformer (T1), brings about starting of the gas discharge in the lamp (La).

4. The pulse starting device as claimed in claim 3, characterized in that the capacitor (C1; C51) is charged, before the gas discharge in the lamp (La) is started, to a DC voltage greater than 300 volts.

* * * * *